Oct. 11, 1932.      R. W. JOHNSON      1,881,637
FUEL REGULATING DEVICE FOR GAS OVENS
Filed Oct. 29, 1928
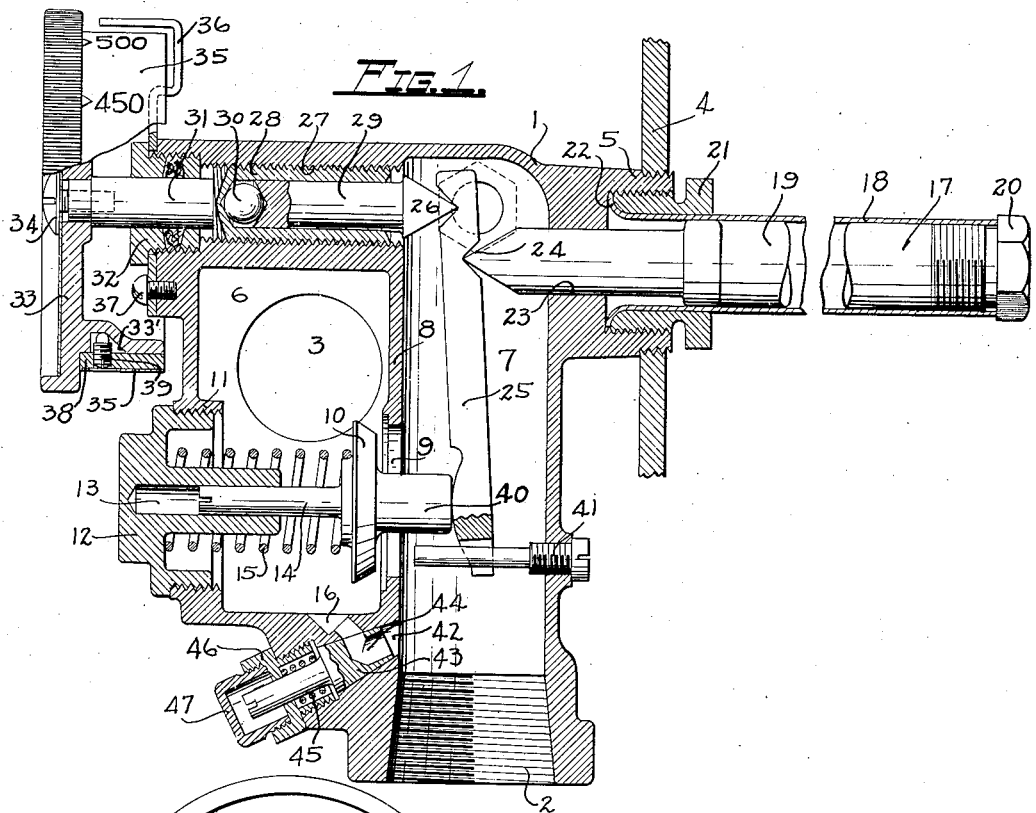
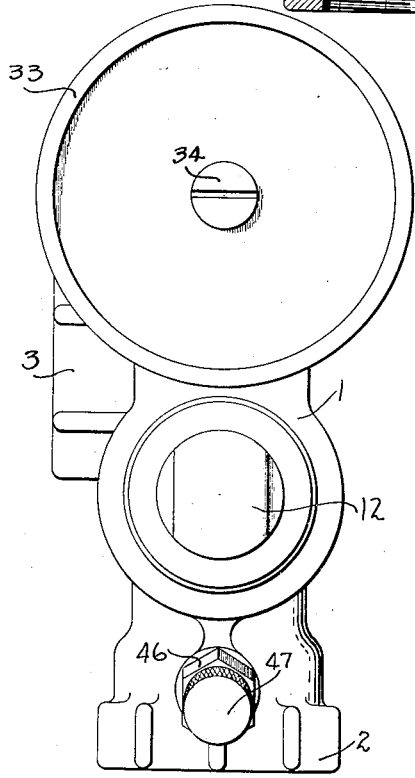
Inventor
Roy W. Johnson
Bottum, Hudnall, Lecher
McNamara & Michael
By
Attorneys Patented Oct. 11, 1932

1,881,637

UNITED STATES PATENT OFFICE

ROY W. JOHNSON, OF MILWAUKEE, WISCONSIN, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE

FUEL REGULATING DEVICE FOR GAS OVENS

Application filed October 29, 1928. Serial No. 315,658.

This invention relates to automatic control devices and more particularly to thermostatic fuel regulating devices especially adapted for controlling the temperature of gas ovens although also adapted for other uses and applications.

Various types of gas regulators for ovens have been devised. In general, these devices consist of a thermostatic element adapted to be associated with the oven to be responsive to the temperature conditions therein, a valve in the gas supply line to a burner in the oven and means for actuating the valve in accordance with movement of the thermostatic element.

The present invention relates to gas regulators of this type and an object of the invention is to provide a unitary and compact arrangement which may be easily installed by workmen who are not particularly skilled in the gas heating art and in which a control valve and actuating means therefor are completely enclosed to protect them and to obviate the danger of leakage of gas.

Another object is to provide a gas regulating device in which the temperature in the oven may be maintained at a predetermined point indicated by a dial and pointer and to provide novel adjustable means for changing the relative position of the dial and pointer.

A further object is to provide means for by-passing a predetermined amount of gas so as to maintain a pilot light or a minimum or low flame at the burner when the main control valve is closed.

Another object is to provide an oven regulator having these advantages and capacities and which is of simple and durable construction, which is adapted to be easily and conveniently applied to the oven and burner and removed therefrom without materially modifying the construction or imparing the operativeness of these parts, and which lends itself to economical manufacture while being capable of controlling with precision the oven temperature over a wide range.

Other objects and advantages reside in certain novel features of the construction, arrangement and combination of parts which will be hereinafter more fully described and particularly pointed out in the appended claims, reference being had to the accompanying drawing forming a part of this specification and in which:

Figure 1 is a vertical cross sectional view of an oven regulator embodying the present invention, a fragment of a wall of the oven being shown for the sake of illustrating one way of mounting the regulator thereon.

Figure 2 is a view in end elevation looking toward the left in Figure 1.

In the drawing, the reference numeral 1 indicates a housing or casing which encloses the operating mechanism of the regulator. The housing is provided with integral nipples 2 and 3 for making the proper connections to pipes connected to a gas supply line and to the burners which heat the oven with which the device is associated. The housing may be supported on the connecting pipes alone or it may be directly secured to the wall 4 of an oven by means of the screw threaded extension 5. As shown in Figure 1 the interior of the housing 1 is divided into two compartments, 6 and 7, by a vertical dividing wall or partition 8, which is provided with a circular port 9 adapted to be closed by a disk valve 10 cooperable with a valve seat formed around the margin of port 9.

To maintain the valve in the proper position, the outer side of the housing is provided with a flanged and internally screw threaded opening 11 for supporting a plug 12 which has an integral guide sleeve 13 in axial alignment with the valve stem 14 which it receives and supports. A coil spring 15 is interposed between the plug 12 and the disk valve for biasing the valve 10 to its closed position. It will thus be seen that when the disk valve 10 is seated on the partition 8, the supply of gas from the inlet or supply connection 2 to the outlet or burner connection 3 is cut off except for a small by-pass 16 which will be described hereinafter.

The position of the disk valve 10 is controlled by adjustable thermostatic mechanism which will now be described. A thermostatic element 17 is secured to the extension 5 of the housing and extends through the wall 4 of an oven whereby to be responsive to the heat conditions therein. The thermostatic element 17 consists of an elongated tube 18 and an elongated rod 19 which is mounted in the tube and is secured thereto at one end as by means of a nut 20 and solder. The tube 18 and rod 19 are made of metals which have different thermal coefficients of expansion so that the free end of the rod 19 moves in response to varying temperature conditions. The use of copper for the tube and "invar" for the rod are suitable for the purpose.

The elongated tube 18 is securely fastened to the housing by means of a hollow screw threaded clamping bushing 21 and the cup shaped extension 5 which engage the opposite sides of the flared end 22 of the tube 18. The rod 19 passes freely through an opening 23 in the housing and its end is shaped to provide a knife edge 24 for engaging a lever 25. The upper end of the lever 25 is fulcrumed on a second knife edge 26 which is adjustably mounted in the upper portion of the housing.

To provide means for adjustably mounting the knife edge 26, the upper end of the housing is provided with a transverse passageway 27 which leads into the compartment 7 at a point adjacent the upper end of the lever. The wall of the passageway is screw-threaded to receive an adjusting screw 28 which is drilled or otherwise hollowed out at its inner end to provide a holding and guiding portion and support for the shank 29 of the knife edge 26 and a seat and abutment for the ball bearing 30. The screw 28 is provided with an integral shaft 31 of reduced diameter which extends through a packing gland 32 in the wall of the housing to be operated by an adjusting knob 33 fixed thereto. By this construction, the knife edge 26 is moved back and forth when the knob is rotated.

There is little tendency for the knife edge to rotate out of its horizontal position, however, because it is freely mounted in the adjusting screw and because friction between it and the screw is minimized by the ball bearing 30.

The operating knob 33 is fixed to the shaft 31 in a definite angular position by means of the screw 34. Further means such as a key may be employed for maintaining a definite angular position between the knob and shaft. The knob carries a cylindrical temperature indicating dial 35 on its inner end and this dial 35 travels under an indicating pointer 36 fixed to the housing 1 in a definite angular position by the set screw 37.

In order to provide means for adjusting the dial with respect to the knob so that the device may be properly calibrated the dial is mounted on a ring 38 secured to the knob in any adjustment by screws 39 which when tightened up have binding engagement with the inclined wall of an annular groove 33' formed in the underlying flange of the knob 33. To calibrate the device the screws 39 are loosened, the ring 38 and dial 35 moved to the proper position and the screws 39 tightened to hold the elements in place.

It will now be clear that the angular position of the knob 33 controls the position of the lower end of the lever 25 when the thermostatic element 17 is subjected to a given temperature. The lower end of the lever 25 is rounded as shown in Figure 1 and bears against the outer end of an abutment or projection 40 on the valve 10 to effect the opening and control the closing of the valve. In order to maintain the lever in alignment with the abutment 40, the lower end of the lever is bifurcated and straddles a guide pin 41 secured to the housing and disposed in the plane of the axis of the valve 10.

As mentioned above, a by-pass for the main valve 10 is provided in the housing for maintaining a minimum or low flame or pilot at the burner. The by-pass illustrated consists of a passageway 16 leading from the compartment 7 to the compartment 6. The passageway 42 is cone-shaped to provide a seat for the cone-shaped adjustable valve plug 43 which has a passageway 44 extending axially for a portion of its length and then transversely out through its periphery and may be rotated to regulate or cut off the passage of gas through the by-pass. A small coil spring 45 is held in place by a hollow cap 46 which may be provided with a removable cover 47.

The operation of the device is as follows: Assuming the by-pass valve 44 has been set to cause a minimum flame to be maintained at the burner for an oven with which the device is associated and that it is desired to maintain the oven at a temperature of 500° F. The operating knob is rotated until the pointer 36 is opposite the numeral 500 on the dial, thus adjusting the position of the knife edge 26 by shifting the fulcrum of its controlling lever 25. Assuming that the thermostatic element 17 is cold, the knife edge 24 is in the position shown (Figure 1) and the valve 10 is opened. Gas will then flow to the burner until the temperature in the oven is raised. As the thermostatic element gradually expands the lever 25 is swung in a counterclockwise direction as viewed in Figure 1 and the valve 10 is moved gradually to the right and the passage of gas is reduced, but not cut off until the desired temperature of 500° is reached. Upon the oven cooling to a point below 500° the thermostatic element in contracting will swing the lever in a clockwise direction as viewed in Figure 1 and the lever pushes the valve 10 open. The lever is free of the valve to permit the valve to seat properly in its closed position without undesirable restraint and while the construction is simple, the opening of the valve is certain and positive.

It will be seen that by this construction a unitary and compact regulator is provided in which all of the moving parts except the operating knob are enclosed. By mounting the operating lever directly in the valve compartments, the valve stem need not project out of the housing and there is no danger of gas leaking at this point. It will also be clear that the device permits of very accurate regulation and is easily adjusted and calibrated.

While only one embodiment of the invention is disclosed herein, it is obvious that various changes in the construction may be made without departing from the spirit of the invention or the scope of the annexed claims.

The invention claimed is:

1. A regulator for gas ovens or the like including a housing having a valve therein and mechanism for operating the valve, adjustable means for varying the operation of said mechanism including a manually adjustable operating element having a laterally extending annular flange, a dial element in the form of a ring fitted on said flange for indicating a temperature range and co-operating means on the flange and ring for adjustably securing the dial to the operating element so as to permit proper calibration of the regulator to cause movement of the valve upon the temperature in the oven reaching that indicated on the dial.

2. In a regulator for gas ovens or the like, a manually operable device for controlling valve actuating mechanism in response to temperature conditions in the oven, an operating element secured to said device and having an annular groove therein with an inclined wall, a ring rotatably mounted on the operating element over said groove, an indicating dial on said ring, and means co-operating with the inclined wall of said groove for adjustably securing said ring to said operating element to permit proper calibration of the regulator.

3. A regulator for gas ovens or the like comprising a housing provided with two compartments arranged in substantially parallel relation with one compartment longer than the other and extending beyond one end of the shorter compartment, a partition wall in the housing between the compartments and having a port therein for communicating said compartments, a spring pressed valve in the shorter compartment for controlling the passage of gas from one compartment to the other through said port, a single lever located in the longer compartment and disposed to extend lengthwise thereof with one end of the lever engaging the valve for opening the same and the other end of the lever continuing to the end of the longer compartment where it extends beyond the shorter compartment, and a fulcrum member and a thermostatic element extending into the longer compartment at the last mentioned end of the lever and engaging the same on opposite sides thereof to respectively support and actuate the lever, said fulcrum member being mounted in the portion of the casing where the longer compartment extends beyond the shorter one.

4. A regulator for gas ovens or the like comprising a housing provided with two compartments arranged in substantially parallel relation with one compartment longer than the other, and extending beyond one end of the shorter compartment, a partition wall in the housing between the compartments and having a port therein for communicating said compartments, a spring pressed valve in the shorter compartment for controlling the passage of gas from one compartment to the other through said port, said valve having an abutment extending through said port into the longer compartment, a single lever located in the longer compartment and disposed to extend lengthwise thereof with one end of the lever engaging the abutment for opening the valve, and the other end of the lever continuing to the end of the longer compartment where it extends beyond the shorter one, a fulcrum member and a thermostatic element extending into the longer compartment at the last mentioned end of the lever and engaging the same on opposite sides thereof to respectively support and actuate the lever in the longer compartment, said fulcrum member being mounted in the portion of the housing where the longer compartment extends beyond the shorter one, and means for adjusting the fulcrum member toward and from the lever.

5. A regulator for gas ovens or the like comprising a housing having a valve therein and a lever for operating the valve, said housing having a screw threaded passage way therein associated with said lever, a hollow adjusting screw fitted in said passage, a fulcrum member for supporting the lever and having a shank extending into said screw and terminating short of the closed inner end thereof, an anti-friction bearing ball supported in the screw between the closed inner end thereof and the opposed end of the shank and engaging both of the same, and a turnable member connected with the screw and accessible from the exterior of the housing for adjusting the fulcrum through the screw.

In witness whereof, I have hereto affixed my signature.

ROY W. JOHNSON.